Figure 3:
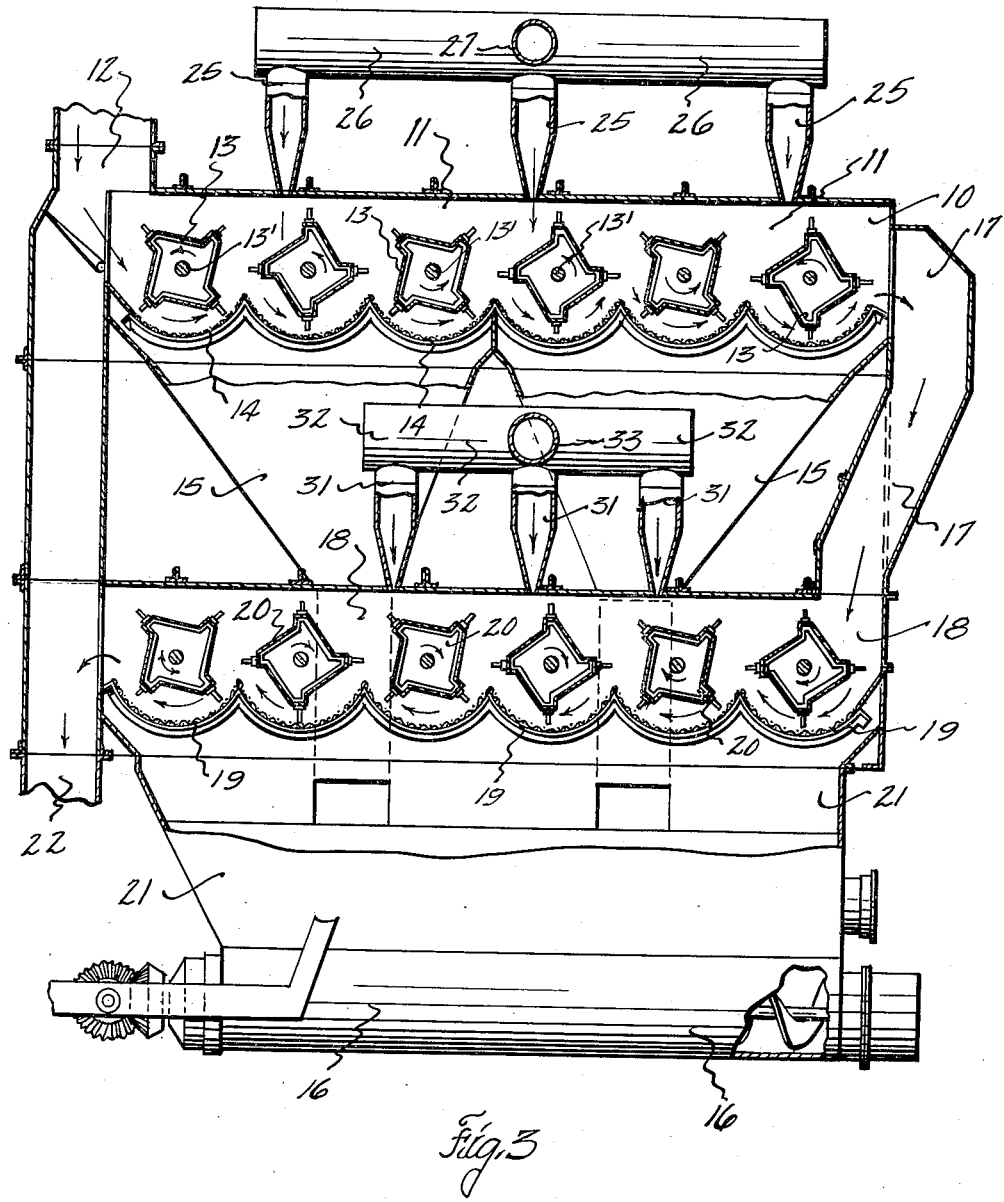

Aug. 24, 1937.  B. C. WOODFORD  2,090,774
COTTON CONDITIONER
Filed Feb. 7, 1936  2 Sheets-Sheet 1
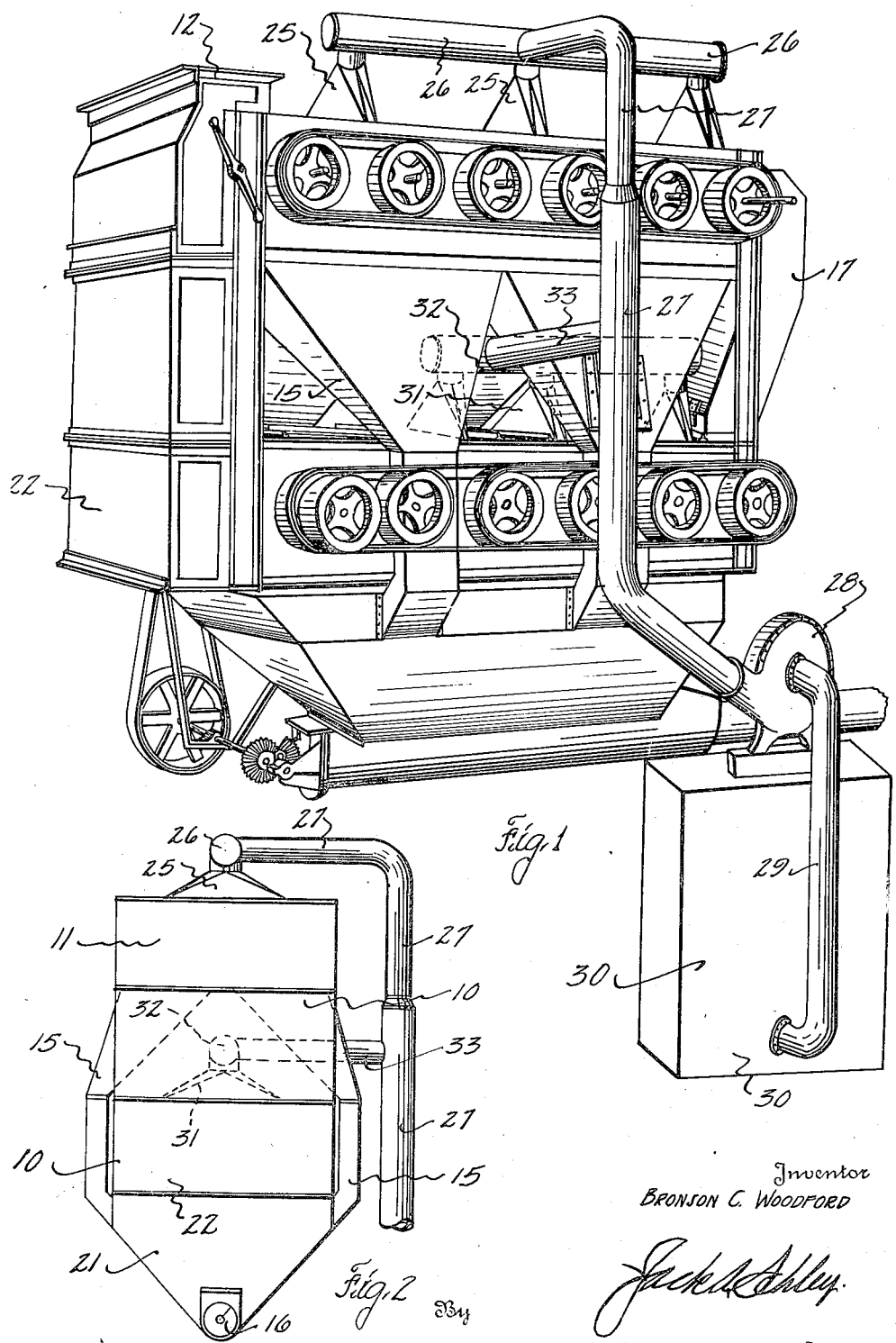
Inventor
BRONSON C. WOODFORD
Jack A. Ashley
Attorney Patented Aug. 24, 1937

2,090,774

UNITED STATES PATENT OFFICE 2,090,774

COTTON CONDITIONER

Bronson C. Woodford, Dallas, Tex., assignor to The Murray Company, Dallas, Tex., a corporation of Texas Application February 7, 1936, Serial No. 62,798

4 Claims. (Cl. 19—93)

This invention relates to new and useful improvements in cotton conditioners.

One object of the invention is to provide an improved cotton conditioner which will thoroughly dry the cotton while it is being cleaned.

An important object of the invention is to introduce heated air into the cotton travelling through an ordinary cotton cleaner, whereby the cotton is thoroughly dried during the cleaning operation.

Another object of the invention is to provide an improved means for drying cotton while the same is passing through a cotton cleaner, said means being so arranged as to introduce heated air downwardly against the cleaner cylinders whereby the air is brought into intimate contact with the cotton to thoroughly dry the same.

Another object of the invention is to provide an improved means for drying cotton while the same is passing through a cotton cleaner, said means including the introduction of heated air transversely into the cleaning chamber in a jetting effect, whereby the velocity of the air entering the chamber is sufficient to assure intimate contact of the air with the cotton passing through the chamber.

A further object of the invention is to provide means for introducing air into the cleaning chamber of a cotton cleaner to maintain an air pressure within said chamber, said pressure serving to overcome the suction created by the rotation of the cleaning cylinders, whereby the fine dust and dirt will not be drawn upwardly from the dirt hopper through the screen to mix with the cotton in the chamber.

A contruction designed to carry out the invention will be hereinafter described, together with other features of the invention.

The invention will be more readily understood from a reading of the following specification and by reference to the accompanying drawings, in which an example of the invention is shown, and wherein:

Figure 1 is a perspective view of an ordinary cotton cleaner having the invention applied thereto, Figure 2 is an end elevation of the same, and Figure 3 is a view, partly in elevation and partly in section, clearly showing the air inlet flues.

In the drawings, the numeral 10 designates an ordinary cotton cleaner which may be of any desired construction. I have shown a standard horizontal cylinder type cleaner which may be purchased on the open market. This cleaner comprises an upper cleaning chamber 11 into which the cotton to be cleaned is introduced through an inlet 12. A plurality of cleaning cylinders 13 are mounted transversely within the chamber 11, and these cylinders extend over concave screens 14 which are concentric to the cylinder shafts 13' and which form the bottom of the chamber 11.

The cotton introduced into the inlet 12 is directed to the chamber 11, and as the cylinders 13 rotate it is carried longitudinally of the chamber over the screens 14. The shale, leaf trash, motes and dirt will fall through the screen into outlet hoppers 15 which have their lower ends connected with a dirt conveyor 16. From the chamber 11, the cotton falls downwardly through a chute 17 to a lower chamber 18, which is constructed exactly as the upper chamber. This lower chamber includes the concave screens 19, drums 20 and outlet hopper 21. After entering the lower chamber, the cotton is carried over the screens 19 the full length of the chamber by the drums 20, and is finally discharged through a discharge outlet 22. It is obvious that the shale, trash, motes, etc. which have not been separated from the cotton in the upper chamber 11 will be separated in the lower chamber 19, whereby thorough cleaning of the cotton is assured. The parts above described are all of the usual construction and are, therefore, subject to variation.

In carrying out the invention, heated air is conducted to the chambers 11 and 18 so as to come in contact with the cotton as it is passing therethrough, whereby said cotton is thoroughly dried before it is discharged from the outlet 22. For supplying the heated air to the upper chamber 11, a plurality of transitions 25 are provided. As is clearly shown in Figure 2, each transition extends transversely over the central portion of the chamber 11, said transition terminating short of the side walls of the chamber. Although any desired number of transitions may be provided, three are shown. The transitions 25 are located one above alternate cleaner cylinders (Figure 3). It is noted that each transition flares upwardly in cross-section, whereby the lower end thereof is contracted to form a restricted transverse slotted nozzle, whereby the air entering the chamber does so under an increased velocity.

By observing Figure 3, it will be seen that the transitions are positioned over the drums so that the air passing downwardly into the chamber, is directed against the cylinders 13. Thus, as the air enters the chamber, it strikes the rotating cylinders, and is circulated by the cylinders. This eliminates danger of the air passing directly downwardly through the screen, which would not only result in a waste of the air, but would cause the cotton passing along the screens 14 to adhere to said screens and be held against said screens by the air pressure. Such action would defeat the cleaning operation. Therefore, the cylinders interrupt the flow of heated air and serve to circulate the same, whereby intimate contact of said air with the cotton is assured.

For conducting heated air to the transitions 25, a longitudinal manifold pipe 26 extends across the upper end of the transitions and has connection with each, whereby air within the manifold is conducted to said transition. A flue pipe 27 has one end connected to the manifold and its other end connected with a blower 28. The blower has communication through a conductor 29, with a suitable heating unit 30. Thus, the air is heated by said unit and is forced through the flue 27 into the manifold 26 by the blower 28. From the manifold, the air is directed into the chamber 11 through the transitions 25, whereby the cotton is thoroughly dried while being cleaned.

The lower chamber 18 is supplied with heated air by transitions 31, which are similar to the transitions 25. These transitions are shown as located over the three adjacent central cleaner cylinders 20, but, if desired, may be mounted the same as the transitions 25, that is, over alternate cylinders. However, in either case, the air is directed against the drums. The upper ends of the transitions 31 are connected to a manifold 32 which, in turn, communicates with the air supply flue 27 through a short pipe 33. Thus, it will be seen that the transitions 25 and 31 are supplied with heated air by the single air supply flue 27. The action of the heated air in the lower chamber 18 is the same as in the upper chamber 11.

It has been found that the air which is ejected into the chamber through the restricted transverse slotted nozzle of each transition not only serves to dry the cotton but also maintains an air pressure in the chamber. It has been found that when no air pressure is directed into the chamber, the suction created by the rotation of the cleaner cylinders will draw fine dirt and dust upwardly through the screen from the dirt hoppers, and this fine dust or dirt will admix with the cotton and will defeat the thorough cleaning of the cotton. It is obvious that when an air pressure is maintained within the chamber, this suction created upwardly through the screens by the rotating cylinders is overcome. Hence, the fine dust and dirt is not drawn upwardly through the screen. This results in nearly all of the air flowing downwardly through the screen thereby eliminating air currents which would have the effect of carrying fine dust and dirt upwardly through the screen. Obviously, however, some of the air will pass out of the machine with the treated cotton. Therefore, even if the air passing through the transitions into the chambers is not heated, it will make for a better and more thorough cleaning action, and the circulation of air will also dry the cotton to a certain extent.

Although the invention is shown as applied to a double chamber cleaner, it is manifest that it could be applied to any type of cleaner having cleaning cylinders. The particular positioning or number of the transitions is subject to variation and, if desired, a transition for each cylinder may be provided.

What I claim and desire to secure by Letters Patent, is:

1. A cotton conditioner including, a cleaner having a chamber, a screened bottom in the chamber, a plurality of drums within the chamber for conducting cotton therethrough over the screened bottom, and a plurality of transverse transitions for directing air downwardly into the upper part of the chamber, each air inlet being directly opposed above a drum whereby the jet of air is directed towards the drum.

2. A cotton conditioner including, a cleaner having a longitudinal chamber therein, a screen bottom in the chamber, a plurality of rotatable drums within the chamber, means for introducing cotton into the chamber whereby the rotatable drums carry the cotton therealong, and means for introducing air into the chamber at the top and at intervals throughout the length thereof, said means being located so as to direct the air separately against several of the rotating drums within the chamber.

3. A cotton conditioner including, a cleaner having a longitudinal chamber therein, a screen bottom in the chamber, a plurality of rotatable drums within the chamber, means for introducing cotton into the chamber whereby the rotatable drums carry the cotton therealong, a series of slotted nozzles for directing air downwardly into the chamber at intervals throughout the upper part thereof, means for conducting hot air to said nozzles under pressure, each nozzle being located in longitudinal alignment with one of the rotatable drums, whereby the air is directed against said drums.

4. A cotton conditioner including, a cleaner having a horizontal longitudinal elongated chamber therein, a screen bottom in the chamber, a plurality of drums rotatable about axes transversely within the chamber, means for introducing cotton into the chamber whereby the rotatable drums carry the cotton therealong, and means for introducing air into the chamber with velocity whereby to overcome the suction created by the rotating drums and prevent fine dirt and particles being drawn upwardly through the screen bottom, said means comprising transitions having restricted slotted openings located at intervals transversely across the chamber and each located above a drum whereby jet of air is directed downwardly towards the drum.

BRONSON C. WOODFORD.